United States Patent [19]

Takefuta et al.

[11] 4,450,942

[45] May 29, 1984

[54] VARIABLE SPEED ROTARY TORQUE TRANSMISSION DEVICE

[75] Inventors: Hideyasu Takefuta; Akira Shinoda, both of Matsuyama, Japan

[73] Assignee: Diesel Kiki Company, Ltd., Tokyo, Japan

[21] Appl. No.: 283,407

[22] Filed: Jul. 15, 1981

[30] Foreign Application Priority Data

Jul. 25, 1980 [JP] Japan .................................. 55-104674

[51] Int. Cl.³ ............................................. F16D 21/04
[52] U.S. Cl. ................................ 192/48.9; 192/48.92; 192/104 B; 192/103 B; 192/109 R
[58] Field of Search .................. 192/30 V, 48.92, 48.7, 192/48.9, 89 R, 104 B, 105 CD, 105 CE, 105 BA, 103 B, 109 R; 188/184, 189, 381

[56] References Cited

U.S. PATENT DOCUMENTS 1,055,071  3/1913  Parker .............................. 192/109 R

FOREIGN PATENT DOCUMENTS 2837922  3/1980  Fed. Rep. of Germany ..... 192/105 CE

*Primary Examiner*—Rodney H. Bonck
*Assistant Examiner*—James J. Merek
*Attorney, Agent, or Firm*—Jordan and Hamburg

[57] ABSTRACT

A centrifugal clutch mechanism couples a first driven element to a drive element for rotary torque transmission at a first speed range from a rotary drive source to a load when the rotation of the drive source is lower than a predetermined reference speed. The centrifugal clutch mechanism includes a double-arm coupling lever pivoted to the drive element, a clutch pad or shoe pivoted to one end of the coupling lever and having a surface engagable with an inner surface of the first driven element, and a pair of centrifugal weights carried on the other end of the coupling lever. At least one flat spring is yieldably fastened to the weight or to a stop rigid on the drive element to be frictionally engaged by the stop or the weight, thereby resisting frictional oscillation of the clutch shoe on the coupling lever during a transition range between completely coupled and completely uncoupled mode of operation of the centrifugal clutch. The flat spring or springs may be so arranged as to be engaged by the coupling lever proper. A second driven element is coupled to the drive element by a one way clutch mechanism for rotary torque transmission at a second speed range, at which time the centrifugal clutch will be uncoupled.

9 Claims, 6 Drawing Figures

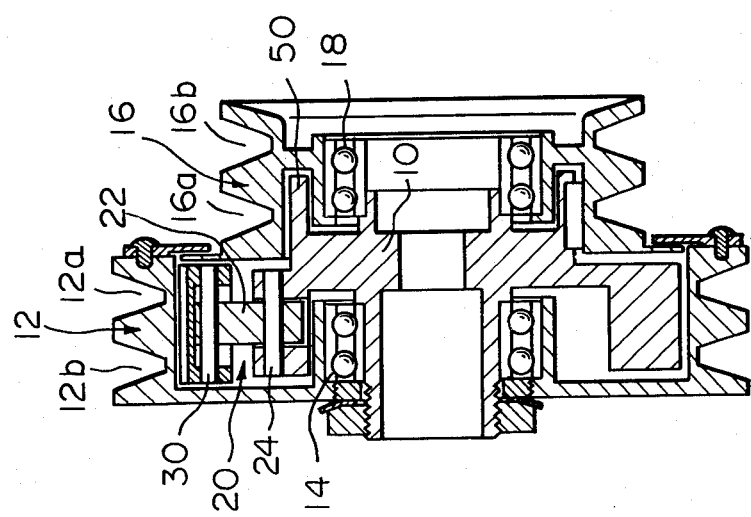

VARIABLE SPEED ROTARY TORQUE TRANSMISSION DEVICE

BACKGROUND OF THE INVENTION

The present invention relates to a rotary torque transmission device interposed between a rotary drive source and a load and, more particularly, to a variable speed rotary torque transmission device which drives the load at two variable speed ranges in accordance with the operating speed of the rotary drive source.

There has been proposed a variable speed rotary torque transmission device designed to transfer a rotary torque from a rotary drive source to at least one load at a first speed range when the operating speed of the drive source is lower than a predetermined reference speed and at a second speed range when the operation of the drive source is accelerated beyond the reference speed. This is to avoid wasteful operations of the load which might eventually damage the load after a long time of service. Also, this type of device prevents the rotary drive source from being overloaded; where the drive source is in the form of an internal combustion engine as is often the case, its fuel economy will be improved.

The prior art device for variable speed rotary torque transmission includes a drive element mounted securely on a shaft which is operatively connected with a rotary drive source. A first driven element and a second driven element smaller in diameter than the first element are mounted freely rotatably on the drive element through ball bearings. The first driven element is locked to the drive element by a centrifugal clutch mechanism when the operating speed of the drive source is below a predetermined reference speed. When the operation of the drive source is accelerated beyond the reference speed, the first drive element is unlocked from the drive element and, instead, the second driven element is locked to the drive element by a one way clutch mechanism. The centrifugal clutch includes a centrifugal body biased by a spring in one direction about its fulcrum on the drive element and, when subjected to a centrifugal forces above a predetermined magnitude, caused to rock in the other direction against the force of the spring. The centrifugal body has an engagement surface which is moved into locking contact with an inner surface of the first driven element when the spring force overcomes the centrifugal force and out of the locking contact when the spring force is overcome by the centrifugal force. The one way clutch comprises wedging members located on an axial extension of the drive element such that they wedge themselves between an inner surface of the second driven element and the drive element when the operation of the drive source is accelerated beyond the reference speed, at which time the centrifugal clutch will have unlocked the first driven element from the drive element.

SUMMARY OF THE INVENTION

A variable speed rotary torque transmission device embodying the present invention comprises a drive element rigidly mounted on a shaft which is operatively connected with a rotary drive source, a first driven element freely rotatably mounted on the drive element through a bearing, a second driven element also journalled on the drive element by a bearing and having a diameter smaller than that of the first driven element, a first clutch adapted to lock the first driven element to the drive element for torque transmission to a load at a first speed range when the rotation of the drive element is maintained below a predetermined reference speed, a second clutch for locking the second driven element to the drive element for torque transmission to the load at a second speed range when the rotation of the drive element is accelerated beyond the reference speed, and suppression means for suppressing frictional oscillation of the first clutch into and out of contact with an inner surface of the first driven element during a transition range between completely coupled and completely uncoupled conditions of the first clutch by exerting frictional resistance to the first clutch.

The first clutch comprises a centrifugal clutch which includes a centrifugal element formed as a double-arm coupling lever pivoted at a fulcrum thereof to the drive element and having an engagement surface at one end thereof, a clutch pad or shoe pivoted at a fulcrum thereof to the one end of the coupling lever and forming the engagement surface, and a pair of centrifugal weight members carried on the other end of the coupling lever, the coupling lever rocking in one direction to move the clutch shoe out of locking contact with the inner surface of the first driven element when subjected to a centrifugal force of a given magnitude corresponding to the reference speed of the drive element. The transmission device further comprises a stop member provided to the driven element and adapted to coact with the free ends of the centrifugal weights to limit an angular movement of the coupling lever in the one direction. The suppression means comprises a flat spring or a pair of flat springs.

In accordance with the present invention, a centrifugal clutch mechanism couples a first driven element to a drive element for rotary torque transmission at a first speed range from a rotary drive source to a load when the rotation of the drive source is lower than a predetermined reference speed. The centrifugal clutch mechanism includes a double arm coupling lever pivoted to the drive element, a clutch pad or shoe pivoted to one end of the coupling lever and having a surface engagable with an inner surface of the first driven element, and a pair of centrifugal weight members carried on the other end of the coupling lever. At least one flat spring is yieldably fastened to the weight member or to a stop rigid on the drive element to be frictionally engaged by the stop or the weight thereby resisting frictional oscillation of the clutch shoe on the coupling lever during a transition range between completely coupled and completely uncoupled conditions of the centrifugal clutch. The flat spring or springs may be so arranged as to be engaged by the coupling lever proper. A second driven element is coupled to the drive element by a one way clutch mechanism for rotary torque transmission at a second range, at which time the centrifugal clutch will have been uncoupled.

It is an object of the present invention to suppress frictional oscillation of a centrifugal clutch of a variable speed rotary torque transmission device during a transition range between completely coupled and completely uncoupled mode of operation.

It is another object of the present invention to substantially free the centrifugal clutch from slippage during the transition range.

It is another object of the present invention to widen the permissible ranges of coefficient of friction, surface roughness and hardness of a clutch shoe of the centrifugal clutch.

It is another object of the present invention to reduce the size and weight of the variable speed rotary torque transmission device.

It is another object of the present invention to provide a generally improved variable speed rotary torque transmission device.

Other objects, together with the foregoing, are attained in the embodiments described in the following description and illustrated in the accompanying drawings.

BRIEF DESCRIPTION OF THE DRAWINGS

FIG. 2 is a sectional view of the device shown in FIG. 1;

FIG. 3 is a diagram demonstrating an exemplary application of the device of FIG. 1;

DESCRIPTION OF THE PREFERRED EMBODIMENT

While the variable speed rotary torque transmission device of the present invention is susceptible of numerous physical embodiments, depending upon the environment and requirements of use, substantial numbers of the herein shown and described embodiments have been made, tested and used, and all have performed in an eminently satisfactory manner.

To facilitate understanding of the present invention, a brief reference will be made to a prior art variable speed rotary torque transmission device illustrated in FIGS. 1 and 2.

Figure 1:
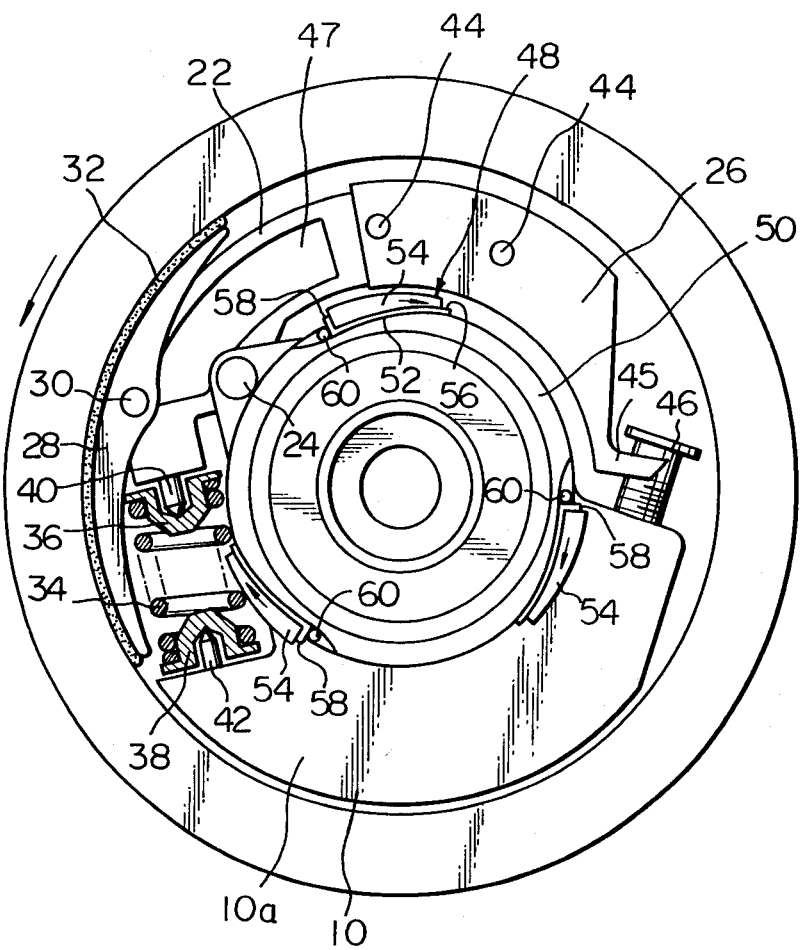
FIG. 1 is a plan view of a prior art variable speed rotary torque transmission device.

The rotary torque transmission device in FIGS. 1 and 2 includes a drive element in the form of a rotary base 10 rigidly mounted on a shaft (not shown) by a spline or key for rotary torque transmission. The shaft is in turn connected to a rotary drive source (not shown) which may be an internal combustion engine of a motor vehicle. A first driven element formed as a large diameter disc 12 is mounted freely rotatably on the drive element 10 through a ball bearing 14. The disc 12 has a plurality of annular recesses or grooves 12a, 12b on its circumference adapted to receive one end of belts (see FIG. 3) individually therein. A second driven element comprises a disc 16 having a small diameter and also journalled on the drive element 10 by a ball bearing 18 in side-by-side relation with the first driven element 12. A plurality of annular recesses or grooves 16a, 16b are also formed on the circumference of the smaller diameter disc 16 for receiving one end of other belts therein. By these belts, the two driven elements 12 and 16 are held in operative connection with preselected loads as will be described.

A centrifugal clutch mechanism generally denoted by the reference numeral 20 is disposed between the drive element 10 and the driven element 12 for selective coupling of the former to the latter. The centrifugal clutch mechanism 20 has a double-arm coupling lever 22 which serves as a centrifugal element and rockable about a pivot pin 24 secured to a bearing section of the rotary base 10. One arm of the coupling lever 22 carries two centrifugal weight members 26 on the opposite surfaces of its free end; the specific gravity of each weight member 26 is selected to be larger than that of the coupling lever 22. A clutch pad or shoe 28 is pivotable about a pivot pin 30 studded on the free end of the other arm of the coupling lever 22. The clutch shoe 28 has an arcuate engagement surface complementary in shape to the inner circumference of the larger diameter disc 12 and is provided with a liner 32 which constitutes the engagement surface. A coiled compression spring 34 rests at one end on an annular flange of a flanged cup 36 and at the other end on an annular flange of a second flanged cup 38. A pin 40 projects from the end of the coupling lever 22 adjacent to the clutch shoe 28 and has a conical tip which abuts against the bottom of the cup 36. A similar pin 42 projects to oppose the pin 40 from a portion 10a of the rotary base 10 which extends along the inner surface of the disc 12, abutting against the bottom of the second cup 38 at its conical tip. The spring 34 yieldably biases the coupling lever 22 clockwise about the pin 24 as viewed in FIG. 1 whereby the clutch shoe 28 on the lever 22 is normally held in locking contact with the inner surface of the pulley 12. The weights 26 are fastened to screws 44 which are passed throughout openings (not shown) in the lever 22. The free ends of the weights members 26 are extended to terminate at aligned finger portions 45. When the coupling lever 22 rocks counterclockwise under centrifugal force as will be described, the finger portions 45 will be brought into abutting engagement with a rigid stop 46 on the rotary base 10 and will be thereby prevented from contacting the inner surface of the disc 12. It is preferable to form a hollow 47 in the coupling lever 22 so as to reduce the weight of the lever 22 and, therefore, that of the entire arrangement.

A one way clutch mechanism 48 is interposed between the drive element 10 and the smaller diameter driven element 16. The drive element 10 is formed with an annular or cylindrical axial extension 50 which has multiple slants 52 on its outer periphery at equally spaced locations along the circumference. Wedging members 54 are individually seated on guide members 56 which are movable on and along the slants 52. At its one end, each guide member 54 has an integral upright lug 58 which limits the movement of the guide member 54 in one direction deeper into the slants 52 than the illustrated position, in abutting engagement with a stop 60 which is rigid on the drive element 10. When the guides 56 move in the other direction along the individual slants 52 on the axial extension 50, the corresponding wedging member 54 will be carried thereby into pressing engagement with the inner surface of the smaller diameter driven element 16 so as to lock the driven element 16 to the drive element 10. The wedges 54 are formed of a suitable material having a relatively large coefficient of friction whereas the bottoms of the guides 56 slidable on the slants 52 are treated with a material which permits easy slipping of the guides on the slants.

An application of the variable rotary torque transmission device having the above construction is schematically shown in FIG. 3 in which the rotary base 10 is mounted on a rotary output shaft of an automotive internal combustion engine by way of example. Belts 62, 63 are received at one end in the groove 12a on the larger diameter disc 12 and the groove 16a on the smaller diameter disc 16, respectively. The belts 62, 63 are passed at the other end over pulleys 64a and 64b of the same diameter which are mounted on a shaft 66. Another belt 62a received in the other groove 12b on the disc 12 connects this disc to a pulley 68 mounted on a fan drive shaft 70 which is in turn connected by a belt 62b to a pulley 72 on a steering pump drive shaft 74. The other groove 16b on the disc 16 receives another belt 63a which extends therefrom to a pulley 76 on a generator drive shaft 78. The pulleys 64a, 64b, 68, 72 and 76 are individually formed with annular grooves at their circumferences in the same way as the discs 12 and 16.

In operation, a varying magnitude of centrifugal force acts on the weights 26 on the coupling lever 22 in accordance with the revolution speed of the internal combustion engine. When the engine speed remains lower than a predetermined reference speed, the bias of the spring 34 overcomes the centrifugal force on the weights 26 which tends to cause the coupling lever 22 to rock clockwise about the pivot pin 24. The spring 34 urging the coupling lever 22 clockwise allows the clutch shoe 28 pivotable on the lever 22 to hold its engagement surface in pressing contact with the inner surface of the disc 12. The disc 12 is in this way driven integrally by the rotary base 10 via the clutch shoe 28. The fan drive shaft 70, steering pump drive shaft 74 and shaft 66 are rotated at speeds which depend on the rotating speed of the drive element 12. A torque transmission path is also established from the pulley 64b on the shaft 66 to the smaller diameter disc 16 by the belt 63, driving the generator drive shaft 78 through the belt 63a also at a speed dependent on the speed of the larger diameter disc 12. Meanwhile, the driven element 16 is disengaged from the annular extension 50 of the drive element 10 because the one way clutch mechanism 48 remains inoperative; the disc 16 rotates at a higher speed than the extension 50.

As the engine speed increases beyond the reference speed, the spring force of the spring 34 is overcome by the centrifugal force on the weights 26 whereby the coupling lever 22 is moved counterclockwise about the pivot pin 24 until the clutch shoe 28 is disengaged from the inner surface of the larger diameter disc 12. The smaller diameter disc 16 this time rotates at a lower speed than the extension 50 so that the guide members 56 slide on the slants 52 causing the wedges 54 carried thereon to wedge themselves between the outer periphery of the extension 50 and the inner surface of the smaller diameter disc 16. Then the driven element 16 is locked to the drive element 10 through the wedges 54 whereby the individual shafts 66 and 78 are rotated at speeds dependent on the speed of the driven element 16. The other driven element 12 receives a rotary torque from the shaft 66 through the pulley 64a and belt 62 to drive the shafts 70 and 74 at speeds also dependent on the speed of the driven element 16. In this way, an increase in the engine speed beyond the reference speed automatically causes the various shafts to rotate at reduced speeds through the smaller diameter disc 16 instead of the larger diameter disc 12.

When the engine speed is lowered below the reference speed, the one way clutch 48 unlocks the driven element 16 from the drive element 10 while the centrifugal clutch 20 locks the driven element 12 to the drive element 10 as will be understood from the procedure discussed hereinabove concerning an increase in the engine speed beyond the reference speed. Then the shafts 66, 70, 74 and 78 are driven at the first or higher speeds which are determined by the rotating speed of the driven element 12.

It will be appreciated from the above that, if the device is so arranged as to switch the first and second speed ranges from one to the other at the saturation point of performance of a compressor or like auxiliary unit, the auxiliary unit can be freed from wasteful operations which might damage it after a long period of time. Additionally, the load on the engine can be reduced with the resultant cut-down in fuel consumption. It will be apparent that the change speed point corresponding to the reference engine speed depends on the weight of the weight members 26, length of the coupling lever 22, intensity of the bias of the spring 34, etc.

Now, the variable speed torque transmission device of the kind described is not fully acceptable in the following respects. When the clutch shoe 28 of the centrifugal clutch 20 is disengaged from the inner surface of the driven element 12 upon an increase in the speed of the drive element 10 or is engaged therewith upon a decrease in the drive element speed, there exists a certain transition range between completely coupled and completely uncoupled conditions. During this transition range, frictional oscillation is brought about to result discontinuous contact of the clutch shoe 28 with the driven element 12 which forms a source of rattling noise. The centrifugal clutch will also constantly slip throughout the transition range allowing heat to be generated by the friction. These are objectionable for upgrading the products and involve the possibility of the clutch shoe being burned by the heat.

Figure 4:
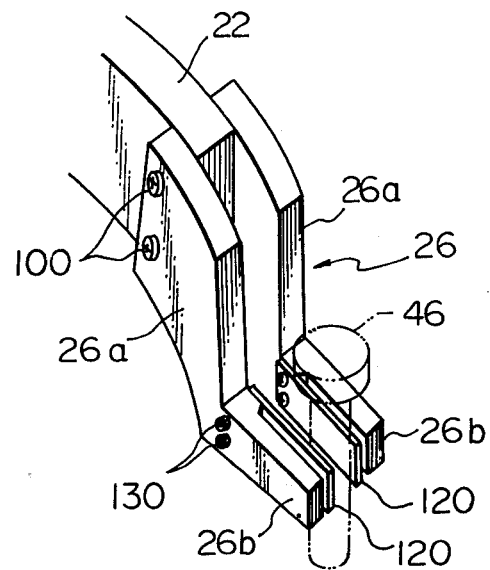
FIGS. 4 and 5 are schematic illustrations of an essential part of a variable speed rotary torque transmission device of the present invention.
Figure 5:
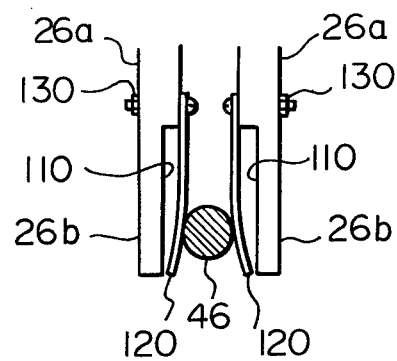

In view of the above description of the conventional variable speed torque transmission device, reference is now made to FIGS. 4 and 5 wherein a preferred embodiment of an essential part of a variable speed torque transmission device according to the present invention is illustrated.

In FIGS. 4 and 5, the device includes a stop 46 formed as a bolt which is threaded into the rotary base 10 and extends therefrom substantially in the tangential direction. A pair of parallel weight members 26 are fastened by screws 100 to the opposite surfaces of the coupling lever 22 in such a manner as to face each other through the stop 46. Each weight member 26 comprises a first or body portion 26a and a second or finger portion 26b which is an angled radially outward extension of the body portion 26a. The inner surfaces of the finger portions 26b opposing each other are notched to form parallel recessed walls 110. Resilient members 120 are fastened to those portions of the inner surfaces of the fingers 26b adjacent to the recessed walls 110 by suitable fastening means such as screw and nut assemblies 130. The resilient members 120 comprise flat springs which yieldably extend in parallel with the general planes of the opposite fingers 26b under unstressed condition. The spacing between the resilient members 120 is such that they contact the shank of the stop 46 from opposite sides with small magnitudes of pressure, that is, with certain friction forces.

When the clutch shoe 28 is caused to oscillate toward and away from a larger diameter disc 12 during the transition range between completely coupled and completely uncoupled conditions, the resilient members 120 resist the frictional oscillation of the clutch shoe 28 and, therefore, the oscillation of the coupling lever 22 toward and away from the disc 12. In this manner, there can be avoided rattles which would otherwise be generated at the time of movement of the clutch shoe 28 into or out of locking engagement with the inner surface of the disc 12. Frictional heat generation between the clutch shoe 28 and the disc 12 is also prevented which might promote burning and wearing of the clutch shoe 28 to degrade the product. Additionally, the clutch shoe 28 is freed from strict precision requirements on the coefficient of friction, surface roughness and hardness.

Furthermore, a torque T transmitted from the clutch shoe 28 to the larger diameter disc 12 is expressed as:

$$T = \mu \cdot N \cdot R$$

where N denotes a drag acting on the clutch shoe 28 upon its engagement with the inner surface of the disc 12, R the diameter of the inner surface of the disc 12, and $\mu$ the coefficient of friction of the disc 12. The frictional oscillation on the other hand increases in proportion to the magnitude of the drag N on the clutch shoe 28. It will be seen that the drag N can be increased due to provision of the flat springs 120 and, hence, the diameter R of the inner surface of the disc 12 can be reduced if the transmission torque T is constant. This affords another and outstanding advantage that the overall size and weight of the variable speed torque transmission device are minimized. Addition of the flat springs 120 does not increase the overall dimensions of the device because they are accommodated in the usual spacing between the weights 26.

Figure 6:
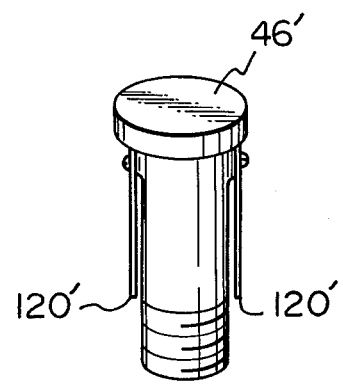
FIG. 6 is a view of another essential part of a variable speed rotary torque transmission device of the present invention.

FIG. 6 illustrates an alternative arrangement of resilient members applicable to the present invention without affecting the advantages stated above. In this case, resilient members 120' are secured to diametrically opposite portions of the shank of a stop 46' which is so modified in shape as to permit yielding of the resilient members 120' radially inwardly theretoward. The inner surfaces of the weights 26 opposing each other will then be held in contact with the individual resilient members 120'.

It should be noted in each of the embodiments described that the number of the resilient members 120 is not limited to two but may be only one. As will also be noted, the resilient members may so arranged as to be engaged by side walls of the coupling lever 22 instead of the weights 26.

In summary, it will be seen that the present invention provides an improved variable speed rotary torque transmission device which suppresses frictional oscillation of a coupling arm included in its centrifugal clutch mechanism by means of at least one resilient member in the form of a flat spring abutted against or fastened to the coupling lever or a member associated therewith. This prevents discontinuous contact of a clutch shoe pivotable on the coupling lever with an inner surface of a disc cooperative therewith for rotary torque transmission during a transition range, thereby avoiding noise, wear and the like attributable to the discontinuous contact.

Various modifications will become possible for those skilled in the art after receiving the teachings of the present disclosure without departing from the scope thereof.

What is claimed is:

1. In a variable speed rotary torque transmission device which has a driven connection with a rotary drive source and a driving connection with a load, a combination comprising:

a drive element rigidly mounted on a shaft which is operatively connected with the rotary drive source;

a first driven element freely rotatably mounted on the drive element through a bearing;

a second driven element journalled on the drive element by a bearing and having a diameter smaller than that of the first driven element;

a first clutch for locking the first drive element to the drive element for torque transmission to the load at a first speed range when the rotation of the drive element is maintained below a predetermined reference speed;

a second clutch for locking the second driven element to the drive element for torque transmission to the load at a second speed range when the rotation of the drive element is accelerated beyond the reference speed;

suppression means for suppressing frictional oscillation of the first clutch into and out of locking contact with an inner surface of the first driven element during a transition range between completely coupled and completely uncoupled conditions of the first clutch by exerting frictional resistance to the first clutch;

said first clutch comprising a centrifugal clutch which includes a centrifugal element formed as a double-arm coupling lever pivoted at a fulcrum thereof to the drive element and having an engagement surface at one end thereof, a clutch pad or shoe pivoted at a fulcrum thereof to said one end of the coupling lever and forming the engagement surface, and a pair of centrifugal weight members carried on the other end of the coupling lever, the coupling lever rocking in one direction to move the clutch shoe out of locking contact with the inner surface of the first driven element when subjected to a centrifugal force of a given magnitude corresponding to the reference speed of the drive element; and a stop member provided to the driven element and adapted to coact with the free ends of the centrifugal weights to limit an angular movement of the coupling lever in said one direction;

the suppression means comprising a flat spring.

2. A combination as claimed in claim 1, wherein the second clutch comprises a one way clutch which includes a plurality of wedging members received on slants positioned at equally spaced locations along the circumference of an axial annular extension of the drive element, the wedging members being slidable outwardly from the individual slants to wedge themselves between an inner surface of the second driven element and the annular extension of the drive element.

3. A combination as claimed in claim 1, wherein the flat spring is fastened to an inner surface of one of the weights to be held in frictional engagement with a shank of the stop member.

4. A combination as claimed in claim 1, wherein the flat spring is fastened to the stop member to be frictionally engaged by an inner surface of one of the weights.

5. A combination as claimed in claim 1, wherein the flat spring is frictionally engaged by a side of the coupling lever.

6. In a variable speed rotary torque transmission device which has a driven connection with a rotary drive source and a driving connection with a load, a combination comprising:

a drive element rigidly mounted on a shaft which is operatively connected with the rotary drive source;

a first driven element freely rotatably mounted on the drive element through a bearing;

a second driven element journalled on the drive element by a bearing and having a diameter smaller than that of the first driven element;

a first clutch for locking the first drive element to the drive element for torque transmission to the load at a first speed range when the rotation of the drive element is maintained below a predetermined reference speed;

a second clutch for locking the second driven element to the drive element for torque transmission to the load at a second speed range when the rotation of the drive element is accelerated beyond the reference speed;

suppression means for suppressing frictional oscillation of the first clutch into and out of locking contact with an inner surface of the first driven element during a transition range between completely coupled and completely uncoupled conditions of the first clutch by exerting frictional resistance to the first clutch;

said first clutch comprising a centrifugal clutch which includes a centrifugal element formed as a double-arm coupling lever pivoted at a fulcrum thereof to the drive element and having an engagement surface at one end thereof, a clutch pad or shoe pivoted at a fulcrum thereof to said one end of the coupling lever and forming the engagement surface, and a pair of centrifugal weight members carried on the other end of the coupling lever, the coupling lever rocking in one direction to move the clutch shoe out of locking contact with the inner surface of the first driven element when subjected to a centrifugal force of a given magnitude corresponding to the reference speed of the drive element; and a stop member provided to the driven element and adapted to coact with the free ends of the centrifugal weights to limit an angular movement of the coupling lever in said one direction;

the suppression means comprising a pair of flat springs.

7. A combination as claimed in claim 6, wherein the flat springs are fastened to opposing inner surfaces of the two weights to be held in frictional engagement with diametrically opposite portions of a shank of the stop member.

8. A combination as claimed in claim 6, wherein the flat springs are fastened to diametrically opposite portions of the stop member to be frictionally engaged by inner surfaces of the two weights.

9. A combination as claimed in claim 6, wherein the flat springs are frictionally engaged by opposite sides of the coupling lever.

* * * * *